US010289973B2

(12) United States Patent
Feller et al.

(10) Patent No.: US 10,289,973 B2
(45) Date of Patent: May 14, 2019

(54) SYSTEM AND METHOD FOR ANALYTICS-DRIVEN SLA MANAGEMENT AND INSIGHT GENERATION IN CLOUDS

(71) Applicant: Telefonaktiebolaget L M Ericsson (publ), Stockholm (SE)

(72) Inventors: Eugen Feller, San Francisco, CA (US); Julien Forgeat, San Jose, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 608 days.

(21) Appl. No.: 14/684,331

(22) Filed: Apr. 10, 2015

(65) Prior Publication Data

US 2016/0300142 A1 Oct. 13, 2016

(51) Int. Cl.
*G06Q 10/06* (2012.01)
*G06N 7/00* (2006.01)
*G06N 20/00* (2019.01)

(52) U.S. Cl.
CPC ....... *G06Q 10/06395* (2013.01); *G06N 7/005* (2013.01); *G06N 20/00* (2019.01)

(58) Field of Classification Search
None
See application file for complete search history.

(56) References Cited

U.S. PATENT DOCUMENTS

| 7,870,243 B1 | 1/2011 | Aikens et al. |
| 2013/0132561 A1 | 5/2013 | Pasala et al. |
| 2014/0298091 A1* | 10/2014 | Carlen ............... H04L 65/80 714/15 |
| 2016/0162382 A1* | 6/2016 | Devin ............... G06F 11/3034 702/186 |
| 2016/0219071 A1* | 7/2016 | Vasseur ............ H04L 63/1425 |

OTHER PUBLICATIONS

Leitner et al. "Runtime Prediction of Service Level Agreement Violations for Composite Services", LNCS 6275, 2010, pp. 176-186.*
Shao et al. "A Runtime Model Based Monitoring Approach for Cloud", IEEE Conference on Cloud Computing, pp. 313-320.*
(Continued)

*Primary Examiner* — Li Wu Chang
(74) *Attorney, Agent, or Firm* — Patent Portfolio Builders, PLLC

(57) ABSTRACT

According to one embodiment, a method in a server end station of a cloud for determining whether a service level agreement (SLA) violation has occurred or is expected to occur is described. The method includes receiving one or more insight models from an insight model builder, wherein each insight model is a based on one or more metrics previously collected from a virtualized infrastructure, and wherein each insight model models a particular behavior in the virtualized infrastructure and receiving real time metrics from the virtualized infrastructure. The method further includes for each of the one or more insight models, determining based on the received real time metrics that one or more services on the virtualized infrastructure is in an abnormal state or is expected to enter the abnormal state, wherein the abnormal state occurs when the insight model indicates that the associated modeled behavior violates a predetermined indicator.

21 Claims, 10 Drawing Sheets

(56) References Cited

OTHER PUBLICATIONS

"Amazon Web Services (AWS)—Cloud Computing Services," <http://aws.amazon.com/>, retrieved Dec. 8, 2014, 2 pages.
"Amazon EC2 Service Level Agreement," <http://aws.amazon.com/ec2/sla/>, retrieved Dec. 8, 2014, 7 pages.
"Apache Spark—Lightning-Fast Cluster Computing," <http://spark.apache.org>, retrieved Dec. 8, 2014, 2 pages.
"Apache Storm, distributed and fault-tolerant realtime computation," <http://storm.apache.org>, retrieved Dec. 8, 2014, 1 page.
"Google Compute Engine—Cloud Computing & IaaS—Google Cloud Platform," <https://cloud.google.com/compute/>, retrieved Dec. 8, 2014, 4 pages, Aug. 17, 2017.
Delimitrou et al., "Quasar: Resource-Efficient and QoS-Aware Cluster Management," Sigarch Comput. Archit. News 42, Feb. 1, 2014, 17 pages.
Novaković et al., "DeepDive: Transparently Identifying and Managing Performance Interference in Virtualized Environments," USENIX Annual Technical Conference (USENIX ATC' 13), 2013, pp. 219-230.
Jung et al., "Mistral: Dynamically Managing Power, Performance, and Adaptation Cost in Cloud Infrastructures," In Proceedings of the 2010 IEEE 30th International Conference on Distributed Computing Systems (ICDCS '10), IEEE Computer Society, 2010, pp. 62-73.
Nathuji et al., "Q-clouds: Managing Performance Interference Effects for QoS-aware Clouds," In Proceedings of the 5th European conference on Computer systems (EuroSys '10), Apr. 13-16, 2010, pp. 237-250.
"PredictorImportance", <http://www.mathworks.com/help/stats/compactregressionensemble.predictorimportance.html>, retrieved Apr. 16, 2015, 3 pages.
Beloglazov et al., "Adaptive Threshold-Based Approach for Energy-Efficient Consolidation of Virtual Machines in Cloud Data Centers", Proceedings of the 8th International Workshop on Middleware for Grids, Clouds and e-Science, ACM, Nov. 29-Dec. 3, 2010, 6 pages.
"K-means clustering", <http://en.wikipedia.org/wiki/K-means_clustering>, retrieved Apr. 16, 2015, 14 pages.

* cited by examiner

900

```
┌─────────────────────────────────────────────────────────────────────────┐
│ Receive one or more insight models from an insight model builder,       │
│ wherein each insight model is a based on one or more metrics            │
│ previously collected from a virtualized infrastructure, and wherein     │
│ each insight model models a particular behavior in the virtualized     │
│ infrastructure                                                          │
│ 902                                                                     │
└─────────────────────────────────────────────────────────────────────────┘
                                    │
                                    ▼
┌─────────────────────────────────────────────────────────────────────────┐
│ Receive real time metrics from the virtualized infrastructure           │
│ 904                                                                     │
└─────────────────────────────────────────────────────────────────────────┘
                                    │
                                    ▼
┌─────────────────────────────────────────────────────────────────────────┐
│ For each of the one or more insight models, determine based on the      │
│ received real time metrics that one or more services on the             │
│ virtualized infrastructure is in an abnormal state or is expected to    │
│ enter the abnormal state, wherein the abnormal state occurs when the    │
│ insight model indicates that the associated modeled behavior violates   │
│ a predetermined indicator                                               │
│ 906                                                                     │
└─────────────────────────────────────────────────────────────────────────┘
                                    │
                                    ▼
┌─────────────────────────────────────────────────────────────────────────┐
│ Send on a message bus a message indicating that the one or more         │
│ services is in an abnormal state or is expected to enter the abnormal   │
│ state                                                                   │
│ 908                                                                     │
└─────────────────────────────────────────────────────────────────────────┘
```

FIG. 9

SYSTEM AND METHOD FOR ANALYTICS-DRIVEN SLA MANAGEMENT AND INSIGHT GENERATION IN CLOUDS

FIELD

Embodiments of the invention relate to the field of networking; and more specifically, to a system and method for analytics-driven service level agreement (SLA) management and insight generation in clouds.

BACKGROUND

Over the past years an increasing number of services ranging from simple web applications to advanced distributed analytics frameworks are deployed in large-scale datacenters operated by third-party cloud providers (e.g., Amazon Web Services®, Google Compute Engine®). Cloud providers leverage virtualization technologies such as hypervisors and containers to achieve high resource isolation and increased resource utilization. While increased resource utilization helps to reduce costs for the cloud provider, cloud customers are looking for predictable service performance via performance guarantees. One way to express service performance guarantees is to establish a Service Level Agreement (SLA) between the customer and cloud provider. SLA's can be broadly classified in two categories: course-grained and fine-grained.

A course-grained SLA can define a service performance guarantee in terms of an uptime percentage. For example, a cloud platform could implement an SLA policy by providing a monthly uptime percentage guarantee of at least 99.95%. Alternatively, SLAs can be expressed in a more fine-grained manner. For instance, performance can be defined in terms of a deadline thus requiring the service to finish within a given time frame. Fine-grained SLAs are especially attractive for cloud customers as they provide strict performance guarantees.

SUMMARY

According to some embodiments of the invention, a method in a server end station of a cloud for determining whether a service level agreement (SLA) violation has occurred or is expected to occur is described. The method includes receiving one or more insight models from an insight model builder, wherein each insight model is a based on one or more metrics previously collected from a virtualized infrastructure, and wherein each insight model models a particular behavior in the virtualized infrastructure. The method further includes receiving real time metrics from the virtualized infrastructure. The method further includes for each of the one or more insight models, determining based on the received real time metrics that one or more services on the virtualized infrastructure is in an abnormal state or is expected to enter the abnormal state, wherein the abnormal state occurs when the insight model indicates that the associated modeled behavior violates a predetermined indicator. The method further includes sending on a message bus a message indicating that the one or more services is in an abnormal state or is expected to enter the abnormal state.

According to some embodiments, the virtualized infrastructure comprises a plurality of server end stations executing one or more service controllers, one or more master workers, and one or more slave workers, wherein each service controller is associated with one or more workloads, wherein each service controller is communicatively coupled with one of the one or more master workers, wherein each master worker controls one or more of the one or more slave workers, wherein the master worker and controlled slave workers execute the workload associated with the service controller that is communicatively coupled with that master worker, and wherein each service controller is associated with a service.

According to some embodiments, the method further includes retrieving one or more service level agreements (SLAs) from an SLA store for one or more services; determining that the real time metrics violate at least one of the one or more SLAs; and sending on the message bus a message indicating that one or more SLA violations have occurred for the one or more SLAs.

According to some embodiments, the SLA store includes one or more SLAs, wherein each SLA includes at least a function of metrics over a period of time, an operator, and a threshold value.

According to some embodiments, the message indicating that an SLA violation has occurred, when received by a cloud orchestrator, causes the cloud orchestrator to send a message to the service controller associated with the SLA to resolve the SLA violation by adjusting the parameters of the master and slave workers associated with the service controller.

According to some embodiments, an application programming interface (API) is exposed to each workload, and wherein custom metrics are collected from each workload using the API.

According to some embodiments, the insight model is an anomaly detection model for modeling whether a service is currently in an abnormal state.

According to some embodiments, the insight model is at least one of a normal distribution of a behavior that is modeled using a function computed based on one or more metrics.

According to some embodiments, the insight model is a resource prediction model for modeling whether a service is expected to enter an abnormal state.

Thus, embodiments of the invention include a system and method for analytics-driven service level agreement (SLA) management and insight generation in clouds.

BRIEF DESCRIPTION OF THE DRAWINGS

The invention may best be understood by referring to the following description and accompanying drawings that are used to illustrate embodiments of the invention. In the drawings:

FIG. 9 is a is a flow diagram 900 according to an embodiment of the invention for a system and method for analytics-driven service level agreement (SLA) management and insight generation in clouds according to certain embodiments of the invention.

DESCRIPTION OF EMBODIMENTS

Figure 1:
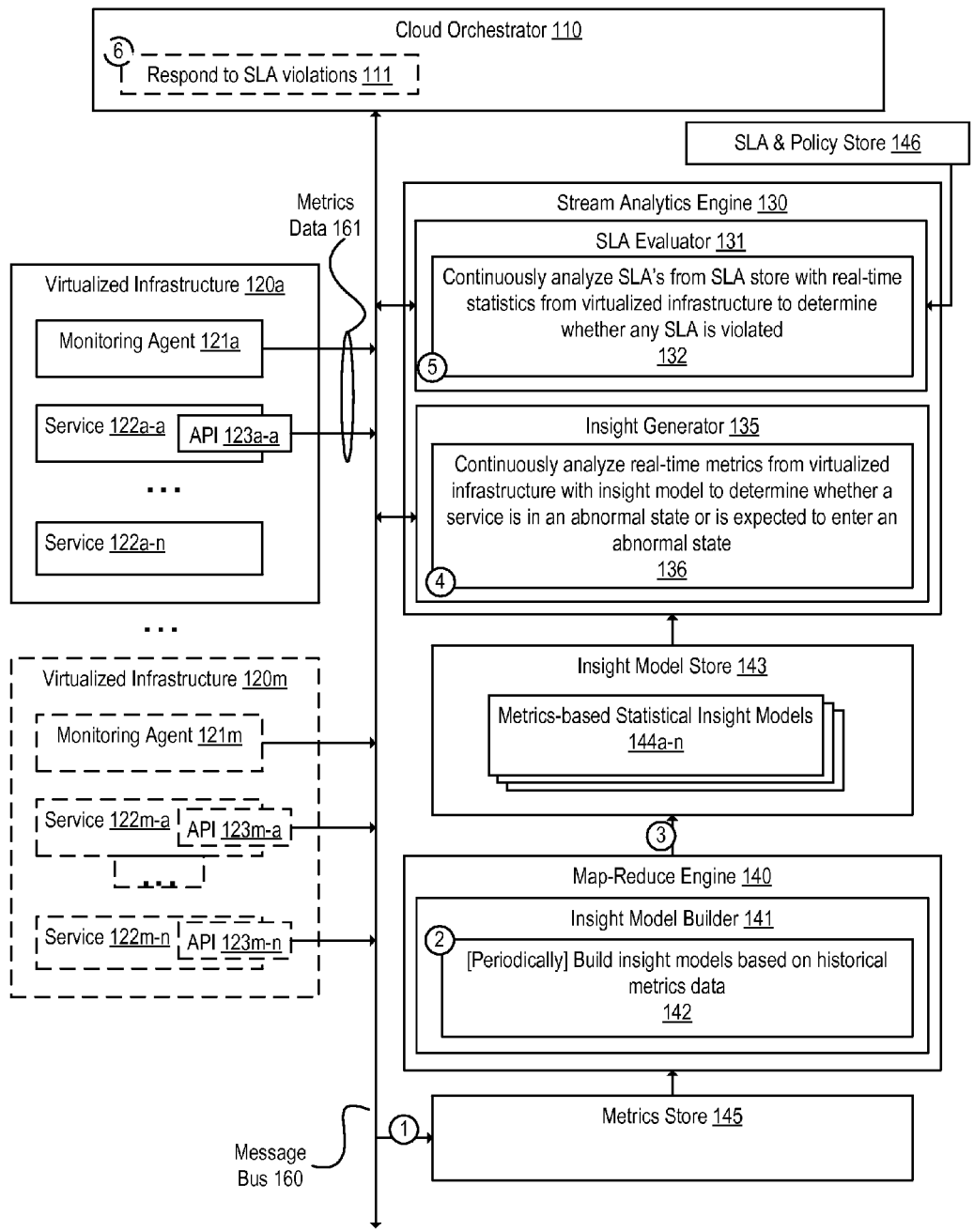
FIG. 1 is a block diagram illustrating a system 100 for a system and method for analytics-driven service level agreement (SLA) management and insight generation in clouds according to certain embodiments of the invention.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a "Uniform Resource Locator" (URL) is one type of "Uniform Resource Identifier" (URI), these terms are used interchangeably herein to refer to a URI, which is a string of characters used to identify a name or a web resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks; optical disks; random access memory (RAM); read only memory (ROM); flash memory devices; phase-change memory) and transitory computer-readable communication media (e.g., electrical, optical, acoustical or other form of propagated signals, such as carrier waves, infrared signals, digital signals). In addition, such electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media of a given electronic device typically stores code (i.e., instructions) for execution on the set of one or more processors of that electronic device. Of course, one or more parts of an embodiment of the invention may be implemented using different combinations of software, firmware, and/or hardware.

One of a cloud provider's goals may be to optimize the adherence to various SLA policies made between the customer and the cloud provider. This may additionally be achieved by insight generation, which may constitute an important part of a virtualized infrastructure. For instance, predicted service resource demands can be used to optimize the infrastructure by adjusting service resource allocations. As another example, insight detection may also cover anomaly detection that deals with the ability of the system to detect abnormal service behavior (e.g., sudden change in service resource usage behavior).

While course-grained SLA's are among the easier ones to implement in a system, they are unable to provide the desired fine-grained performance goals. For instance, being able to offer a certain uptime does not guarantee that service performance (e.g., execution time) will be achieved and vice versa. On the other hand, enabling fine-grained SLA's is a challenging task, as it requires a system taking a holistic view on components such as service SLA definition, service resource utilization and performance monitoring, service performance modeling, real-time SLA violation detection, algorithms and mechanisms to resolve SLA violations. However, as shown below, many methods of SLA enforcement do not federate (i.e. allow to work together) these elements. Without federation, these exemplary systems may have certain disadvantages.

Some methods of enforcing SLAs may include systems that that target both high resource utilization and application performance. Such a system may avoid the use of fixed resource reservations as they introduce resource underutilization. Instead, users express performance constraints while the system determines the right amount of resources. Given those performance constraints, they system may use classification techniques to determine the impact of resource allocations to services as well as performance for all services. The classification results are then used to perform joint resource allocation and assignment. Services are continuously monitored and resource allocations are adjusted when needed. However, such systems do not allow the application to specify and report low-level SLA's such as a deadline. Indeed, the only supported performance guarantee is the amount of allocated resources (e.g., memory), but a given amount of allocated resources does not guarantee a bounded performance due to potential contention of shared subsystems (in this case memory).

Another method may include a system for transparently identifying and managing performance interference between services co-located on the same physical machine in Infrastructure-as-a-Service cloud environments. Such a system leverages low-level metrics (e.g., hardware performance counters), which can be easily obtained at the system level to detect when interference is occurring and what resource is causing it. The system quickly learns about interference across co-located services and integrates an efficient low-overhead approach to identify a service to physical machine placement that avoids interference and migrates the service. This system focuses on the problem of service interference while ignoring the overall SLA dimension. For instance, no means are provided to define and enforce a given performance such as execution or response time.

In yet another system, a holistic controller framework optimizes power consumption, performance benefits, and the transient costs incurred by various adaptations and the controller itself to maximize overall utility. This system can handle multiple distributed services and large-scale infrastructures through a multi-level adaptation hierarchy and scalable optimization algorithm. This system periodically checks if some services need to be migrated to meet performance targets. To estimate the benefits of the adaptation actions it integrates four prediction modules (performance, power, cost, and workload) and one optimization module. The outputs of all the prediction modules are fed into an optimization module, which decides on the optimal set of actions using a heuristic algorithm. Such a system leverages modeling to come up with a good service model, which is used to predict performance. However, no means are provided for the actual service to indicate SLA violations. Similarly, no mechanisms exist to react to service initiated SLA violations or generate insights.

Another method may include a QoS-aware control framework that tunes resource allocations to mitigate performance interference effects. This uses online feedback to build a multi-input multi-output model that captures performance interference interactions, and uses it to perform closed loop resource management. Moreover, it allows services to specify multiple levels of QoS as specific service states. For such services, the framework dynamically provisions under-utilized resources to enable elevated QoS levels, thereby improving system efficiency. However, the service states are static and cannot be modified at run-time. Additionally, this framework treats services as black boxes and does not allow them to report performance issues at run-time. It is therefore impossible for this system to resolve situations in which resource allocations are satisfied while the actual service performance is suffering such as in the event of service interference.

The exemplary systems described above are not aware of the actual workload being executed by a service. They are therefore unable to take decisions involving tuning the workload parameters. Being able to tune workload parameters at run-time is especially important for new types of services that have emerged over the past years. Examples of such services are various big data analytics frameworks (e.g., Apache Spark or Storm). Such services serve as distributed platforms for multiple workloads. For instance, one workload could be word count in a set of documents while another service could provide real-time analytics for connected cars. Each of these workloads has their own performance requirements, which needs to be enforced. In the former example, performance can be defined as the word count execution time. In the real-time car analytics case performance metric could be defined as the throughput at which car events are processed. It is critical for a system to enforce various SLA's for a mix of workloads, which run on top of the same distributed service.

Thus, embodiments of the invention provide for methods, systems, and apparatuses for determining whether a service level agreement (SLA) violation has occurred or is expected to occur, based on one or more insight models that model a particular behavior in the cloud or virtualized environment. More specifically, embodiments of the invention 1) enforce SLAs based on metrics received from the virtualized infrastructure and the services themselves that are executing on the virtualized infrastructure (using an application programming interface or API); and 2) provide insights into various features (which are computed based on the metrics) of the virtualized infrastructure to determine whether the features are in an abnormal state or are predicted to enter an abnormal state, where these insights are generated using machine learning methodologies.

FIG. 1 is a block diagram illustrating a system 100 for a system and method for analytics-driven service level agreement (SLA) management and insight generation in clouds according to certain embodiments of the invention.

System 100 includes a virtualized infrastructure 120a-m. Virtualized infrastructure 120 represents one or more computing devices and the virtualization software executing on the computing devices such that multiple services may execute on the computing devices while being isolated from each other. In some embodiments, virtualized infrastructure 120 is configured in a similar fashion to the hardware and software platforms used by cloud providers to deliver services and/or resources to cloud customers, who are typically accessing the services and/or resources via a wide area network (WAN), such as the Internet. This virtualized infrastructure may provide various services, such as infrastructure as a service (IaaS), platform as a service (PaaS), and software as a service (SaaS).

For example, the virtualized infrastructure may comprise one or more hardware computing devices, with one or more hypervisors and/or virtual machine (VM) software components executing on each. A workload may be executing on each hypervisor or VM (or in some cases on bare metal), and these workloads may individually represent services used by a client, or may each be part of a distributed whole that represents a service. Each virtualized infrastructure 120 in FIG. 1 may represent one computing device, or may represent multiple computing devices. An example of a service may be a web application.

Each virtualized infrastructure may have one or more services, such as services 122a and 122m. Additionally, each virtualized infrastructure includes a monitoring agent 121. This agent may be a software and/or hardware component that is able to monitor and report on various metrics (e.g., performance or behavior indicators) regarding the virtualized infrastructure 120. These metrics may be sent out via the message bus 160. Examples of metrics include CPU usage, RAM usage, network usage and/or statistics, storage medium usage, downtime, usage statistics, warnings, failure indicators, and so on.

In some embodiments, some of the services executing on the virtualized infrastructure also interface with an application programming interface (API) 123. The API 123 allows the services to send custom metrics to the message bus 160 that can be understood by the SLA enforcement system (which will be described shortly). These custom metrics may be defined by the service (i.e., by an engineer who created the service), or they may be pre-defined metrics provided by the API into which the service can provide a value (or other indicator). For example, a custom metric may be a specialized performance indicator such as simultaneous users per minute, and a pre-defined metric may be database queries per second, which a service that has a database might use to indicate the number of accesses to its database per second. Other examples of metrics include processing delay for an analytics service or response time of a web server, queue length for a load balancer, and so on.

System 100 includes a cloud orchestrator 110. The cloud orchestrator 110 performs various maintenance and administrative tasks regarding the virtualized infrastructure, and other tasks that are centralized in nature. The cloud orchestrator 110 may also be in charge of managing the multiple computing, networking and storage hardware constituting the virtualized infrastructure 120 (2) and orchestrating the services 122.

System 100 includes a message bus 160. Message bus 160 is able to transfer messages between various components of system 100. These messages may include metrics data and SLA violation messages and insights messages. In some embodiments, message bus 160 is implemented using RabbitMQ® (Pivotal, Calif.) or Kafka (Apache Software Foundation, MD). Additional implementation details for some embodiments of the invention will be described later herein.

In FIG. 1, the circled numbers are used to denote one exemplary order/sequence of the transactions in FIG. 1. At circle 1, one or more metrics, either sent by the monitoring agent 121 or through an API, are received by the metrics store 145 via message bus 160. Metrics store 145 is a computer readable storage media that may be a separate storage component or may be part of a storage device that is shared among many other components. In some embodiments, these metrics are received in real-time from the virtualized infrastructure. In some embodiments, metrics store 145 uses Hadoop Distributed File System (HDFS, Apache Software Foundation, MD). In some embodiments, metrics store 145 is communicatively coupled with a daemon that listens on the message bus 160 for newly sent metrics and pushes these metrics to the metrics store 145.

At circle 2, the metrics are retrieved by the map-reduce engine 140, and the insight model builder 141 of the map-reduce engine 140 builds insight model(s) based on the historical metrics data stored in the metrics store 145 at block 142. These insight models model a particular behavior in the virtualized infrastructure. For example, a simple model might model the distribution of the ratio of received traffic to CPU utilization. A high ratio might indicate that CPU resources are adequate, and a low ratio may indicate that more CPU resources are required, or that optimization is needed. A more complex model may use machine learning methodologies to model more complex behavior. For example, a model may include a Bayesian network used to model a predicted behavior given a prior input. Such a model could be used to predict whether an abnormal state might occur given prior inputs. As another example, a model may include a neural network. This neural network may be used to model a behavior in order to recognize patterns in the behavior that may indicate an abnormal state might occur or has already occurred. An exemplary insight model is described herein with reference to FIG. 5.

These machine learning models may be trained using the prior historical data stored in the metric store 145 and may also be trained using modification by a human expert in the field (i.e., a domain expert). Additional training data may include a log of all prior abnormal states (as defined by an administrator) and the metrics that were reported during those abnormal states. An abnormal state is a condition of the system where one or more metrics and/or the condition of the system strays beyond the criteria of a desirable normally running system. Such an abnormal state may be defined by an SLA policy, or by an administrator.

The insight models may be built using the map-reduce engine 140. Map reduce is a well-known programming model for processing large data sets, such as the metrics in the metrics store. A collection of metrics from the metrics store 140 may be gathered by the map-reduce engine 140, and then split into subsets. These subsets are mapped, and then shuffled, and then reduced in such a way so that they may be organized into a format that is easily searchable and manipulated. Map reduce typically operates on data that is stored in key value pairs. Metrics may be stored in such a format as they may have a key indicating what the metric is (e.g., CPU usage), and a value indicating a timestamp and/or the value of the metric (and possibly other data). As each step in map reduce model can be customized to perform different functions, the metrics may be reorganized in a way to easily facilitate insight model building. Furthermore, as each step in the map reduce model can be distributed (i.e., executed in parallel), this process may speed up the processing of the metrics and the building of the insight models. Examples of map reduce frameworks include Apache Spark or Hadoop MapReduce (Apache Software Foundation). Additional embodiments regarding insight model building will be described herein with reference to FIG. 3.

At circle 3, the insight models generated by insight model builder 141 are stored in insight model store 143 as insight models 144a-n. In some embodiments, insight model builder builds the insight models periodically (e.g., once a day) based on newly received metrics, and the insight models 144 are updated with these updated models.

At circle 4, insight generator 135 may retrieve the stored insight models from insight model store 143 and at block 136 continuously analyzes the real time metrics from the virtualized infrastructure 120 with the insight models to determine wither a service is in an abnormal state or is expected to enter an abnormal state. The type of determination made may depend on the type of insight model being analyzed. For anomaly detection insight models, then the determination may be that the corresponding service is currently in an abnormal state. For a resource prediction insight model, the determination may be that the corresponding service is expected to enter an abnormal state in the near future. Once a determination is made that a service is in an abnormal state or is expected to enter an abnormal state, the insight generator 135 submits a message to the message bus 160 with the insight determination. This insight determination may further indicate that an SLA policy violation has occurred. Additional embodiments for insight generation will be described herein with reference to FIG. 5.

At circle 5, at block 132, the SLA evaluator 131 continuously analyzes SLAs from the SLA store 146 with real-time statistics and/or metrics received from the virtualized infrastructure (via the message bus 160) to determine whether any SLA has been violated. Information regarding SLAs are stored in the SLA store 146. The SLA store 146 may include SLA definitions, which are a set of rules that need to be enforced based on a set of metrics collected by the infrastructure, and SLA policies, which are actions that the orchestrator should take whenever one of the SLA definitions are not fulfilled. In some embodiments, SLA definitions are a function of one or more metrics for a given service aggregated over a time period, an operator (mathematical), and a value. If the function is evaluated as false with regards to the operator and the value, then an SLA has been violated. If an SLA is violated, the SLA evaluator 131 sends a SLA violation message on the message bus 160. Additional embodiments for insight generation will be described herein with reference to FIG. 6.

Both the SLA evaluator 131 and the insight generator 135 are part of the stream analytics engine 130. The stream analytics engine 130 uses a stream analytics framework. A stream analytics framework includes a processing engine that is able to efficiently analyze a large amount of real-time data quickly. It provides interfaces for programmers to more easily define methods of analyzing the data without having to worry about low-level details such as distributing the analysis among multiple computing devices. Examples of stream analytics frameworks include Apache Storm, Apache S4, or Apache Spark Streaming (Apache Software Foundation, MD).

The cloud orchestrator 110 can receive the insight messages or the SLA violation messages through the message bus 160. These messages indicate that a service is in an abnormal state or is expected to enter an abnormal state. At circle 6, the cloud orchestrator 110 may respond to the SLA violations at block 111. The response may be based on the actions defined in the SLA policies stored in the SLA store 146. The cloud orchestrator may instead send a message to a controller executing on one of the virtualized infrastructures 120 associated with the service 122 related to the message and have that controller resolve the issues related to the abnormal state.

In this way, this federated system allows for better response and management of issues within a virtualized environment. This novel system combines advanced monitoring at the virtualization layer while allowing services to expose key performance indicators (KPIs) for SLA and insight management (through the API). Previously, services were considered as black boxes and thus the system relied on the infrastructure to provide metrics. However, infrastructure metrics are limited to low-level resources (e.g., CPU, memory), which are not accurate enough to obtain the overall picture of the service performance. Furthermore, in the past service models were considered as given. However, this may not be ideal as those models may not be accurate. Instead, using a machine learning based SLA violation and insight generation pipeline takes a holistic view on the problem, starting from model building to real-time model consumption.

Figure 2:
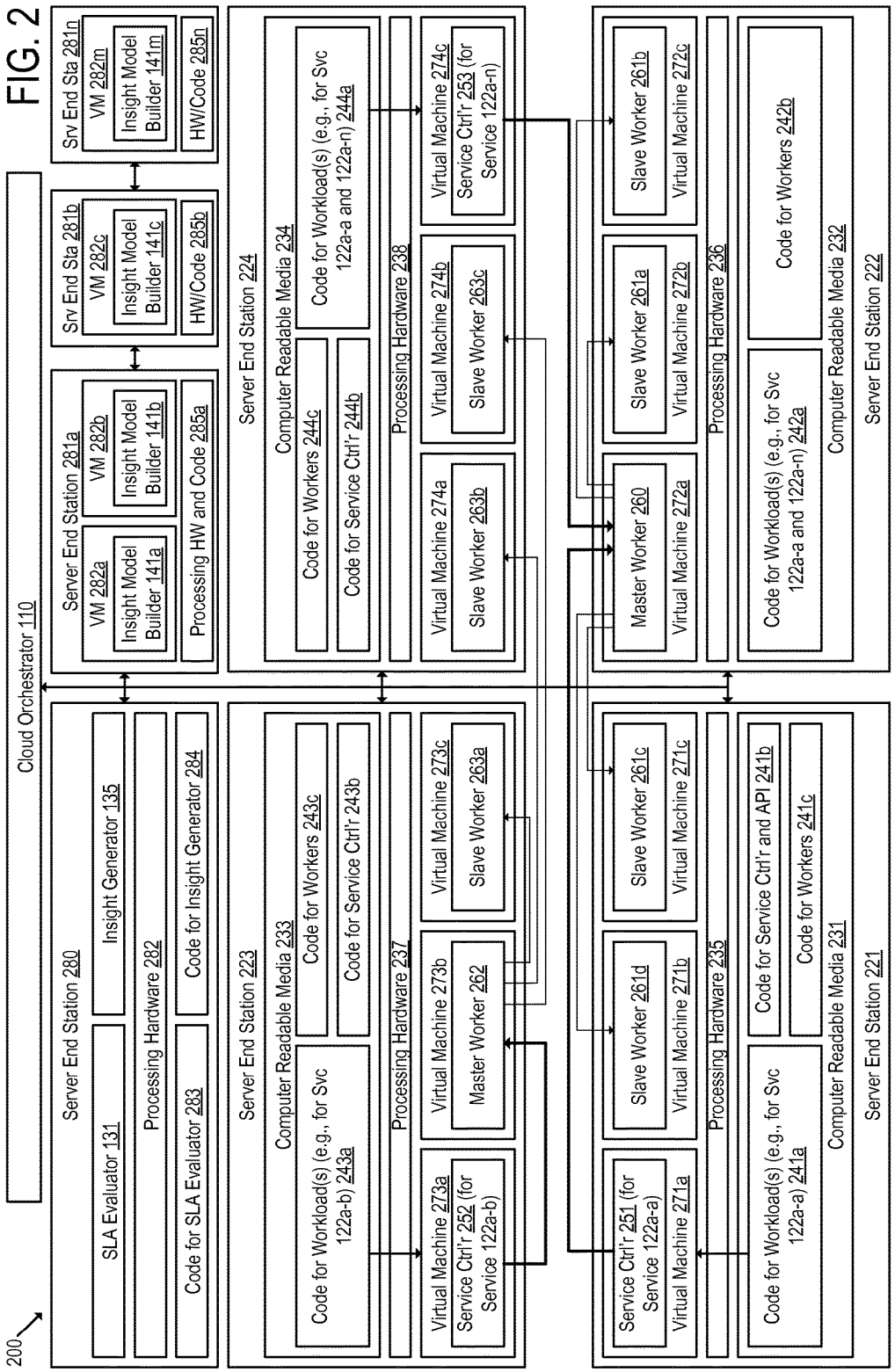
FIG. 2 is a block diagram of a system 200 illustrating an exemplary implementation for a system and method for analytics-driven service level agreement (SLA) management and insight generation in clouds according to certain embodiments of the invention.

FIG. 2 is a block diagram of a system 200 illustrating an exemplary implementation for a system and method for analytics-driven service level agreement (SLA) management and insight generation in clouds according to certain embodiments of the invention.

In some embodiments, the services 122 in the virtualized infrastructure 120 are implemented using a combination of service controllers, master workers, and slave works as shown in FIG. 2. With advanced data analytics frameworks, such as those described above, services themselves have become complex distributed systems. Such services serve as platforms to execute multiple workloads. By introducing a service controller as described below, it is now possible for the cloud orchestrator to enforce SLA's for every workload.

Each service may execute multiple workloads. Examples of workloads include applications such as a web server or a database server, or tasks such as counting the number of words in a document or real time analytics of smart connected cars. As there may be many services distributed throughout the computing devices within the virtualized infrastructure, there may be a benefit to decentralizing some of the management aspects of these services.

To achieve this, in some embodiments, the virtualized infrastructure 120 includes one or more service controllers, such as service controllers 251-253 in FIG. 2. Each service controller controls a single service 122. This control may include starting the service, stopping the service, adjusting parameters, etc. An important task that the service controllers 251-523 perform are to respond to both SLA violations and insight messages that indicate that an abnormal state has occurred or is expected to occur. For each type of insight message or SLA violation, the cloud orchestrator may relay the message or violation to the appropriate service controller 251-253 in charge of the service in question and request that the service controller resolve the issue. The resolution that each service controller applies to the particular type of issue may be preconfigured from a library of preconfigured actions (e.g., add more resources from a spare resource pool or throttle usage) or may be custom configured for the particular type of insight or SLA violation and service that is being controlled (e.g., for a service that analyzes connected cars, if the abnormal state indicates that the analysis speed is below a certain threshold, the custom action may be to request that a certain number of cars enter into an autonomous processing mode, or the action may be to send a purchase order for more processing power to the cloud provider, etc.).

Note that although FIG. 2 illustrates a particular number and combination of components, in other embodiments the number and configuration of components may be different.

Each service controller 251-253 executes on a server end station, such as server end stations 221-224. Server end stations are computing devices on which applications execute and from which a user on a client end station may access and retrieve data. Each service controller 251-253 requests that the workloads associated with the corresponding service to be executed via a master worker, such as master workers 260 and 262. Each server end station 221 may include zero, one, or more than one master worker. Each master worker is associated with one or more slave workers. For example, as illustrated in FIG. 2, master worker 260 is associated with slave works 261a-d (as indicated by the thinly weighted arrows). Furthermore, each master worker may have multiple service controllers requesting execution of workloads from it. Thus, for example, in FIG. 2 both service controller 251 and service controller 253 communicate with the same master worker 260.

Each master worker (e.g., master workers 260 and 262) may add or remove slave workers as needed to process the workload within the desired performance requirements or resource restraints as specified by a policy set by an administrator or by the customer for that workload and/or service associated with the workload. The number of slave workers to initialize may be specified by the service controller to the master worker. The code for the workloads may be stored on computer readable media on each server end station and may be propagated to each server end station by the cloud orchestrator (possibly via the service controller). In FIG. 2, the code for the workloads is represented by computer codes 241*a*, 242*a*, 243*a*, and 244*a* on the respective computer readable media 231-234. This code may take the form of a Java Archive (JAR) file.

Each worker, whether a master or slave, and each service controller, may execute on a virtual machine, such as virtual machines 271-274. In some embodiments, the service controllers and workers execute on bare metal on the server end stations directly on processing hardware (e.g., processing hardware 235-238.

Each server end station may also include the base code for the workers (e.g., code 241*c*, 242*b*, 243*c*, and 244*c*). This code for workers may have the basic code used by the workers to execute the workloads. For example, if the workloads are JAR files, then the code for the workers may include supporting libraries to allow the execution of the JAR files (e.g. Java virtual machine software), as well as code needed to allow for the distributed computing between the various workers (e.g., Apache Spark or other distributed programming framework).

Each server end station may also include the code for the service controller and APIs (e.g. code 241*b*, 243*b*, and 244*b*). This code may include the basic code for service controllers, which may include code to allow for the service controller to communicate with the cloud orchestrator 110. The code for the service controller may also include code that when executed allows the service controller to respond to the insight messages and SLA violations generated by the insight generator 135 and SLA evaluator 131. Some server end stations may also include code for the API 123. This API allows each service that is attached to a service controller to submit custom metrics (also known as key performance indicators) to the metrics store 145 as described herein.

In addition to the server end stations 221-224 (and in some embodiments additional server end stations) that represent the virtualized infrastructure 120, the exemplary implementation also includes server end stations, such as server end station 280 and server end stations 281, configured to execute the functionality of the SLA evaluator 131, insight generator 135, and insight model builder 141 as described herein. In FIG. 2, server end station 280 includes the SLA evaluator 131 and its associated code 283, as well as the insight generator 135 and its code 284, along with processing hardware 282. Additionally, the insight model builder 141 is distributed over multiple server end stations 281*a-n* in FIG. 2. Each instance of the insight model builder may also execute on a virtual machine 282*a-m*. As the insight model builder 141 uses a map-reduce framework, the distribution of its work allows for increased parallelization performance. Each server end station 281 executing the insight model builder may include the hardware and code 285 for executing the functionality of the insight model builder 141.

In the specific configuration in FIG. 2, the service controller 251 executes service 122*a-a* via master worker 260, which controls slave workers 261*a*, 261*b*, 261*c*, and 261*d*. Service controller 253 executes service 122*a-n* and also utilizes the master work 260 and its network of slave workers. Service controller 252 executes service 122*a-b* and uses master worker 262 and its network of slave workers 263*a-c*. As noted previously, the configuration in FIG. 2 is only an exemplary configuration, and alternative embodiments may have many more server end stations and a different combination of service controllers, master workers, and slave workers.

The service controllers and workers on the server end stations may automatically be configured by the cloud orchestrator based on basic configuration input by an administrator or a customer. This automatic configuration may be based on a basic restrictions provided by an administrator and based on the capabilities of each server end station. For example, the administrator may indicate that one server end station may only have a certain number of service controllers or master/slave workers, or that a master worker must have slave workers on at least a certain number of different server end stations. In other embodiments, an administrator configures each individual server end station with a fixed set of service controllers and workers and the cloud orchestrator only selects those service controllers and workers that are free to assign services (with their workload(s)) to.

Figure 3:
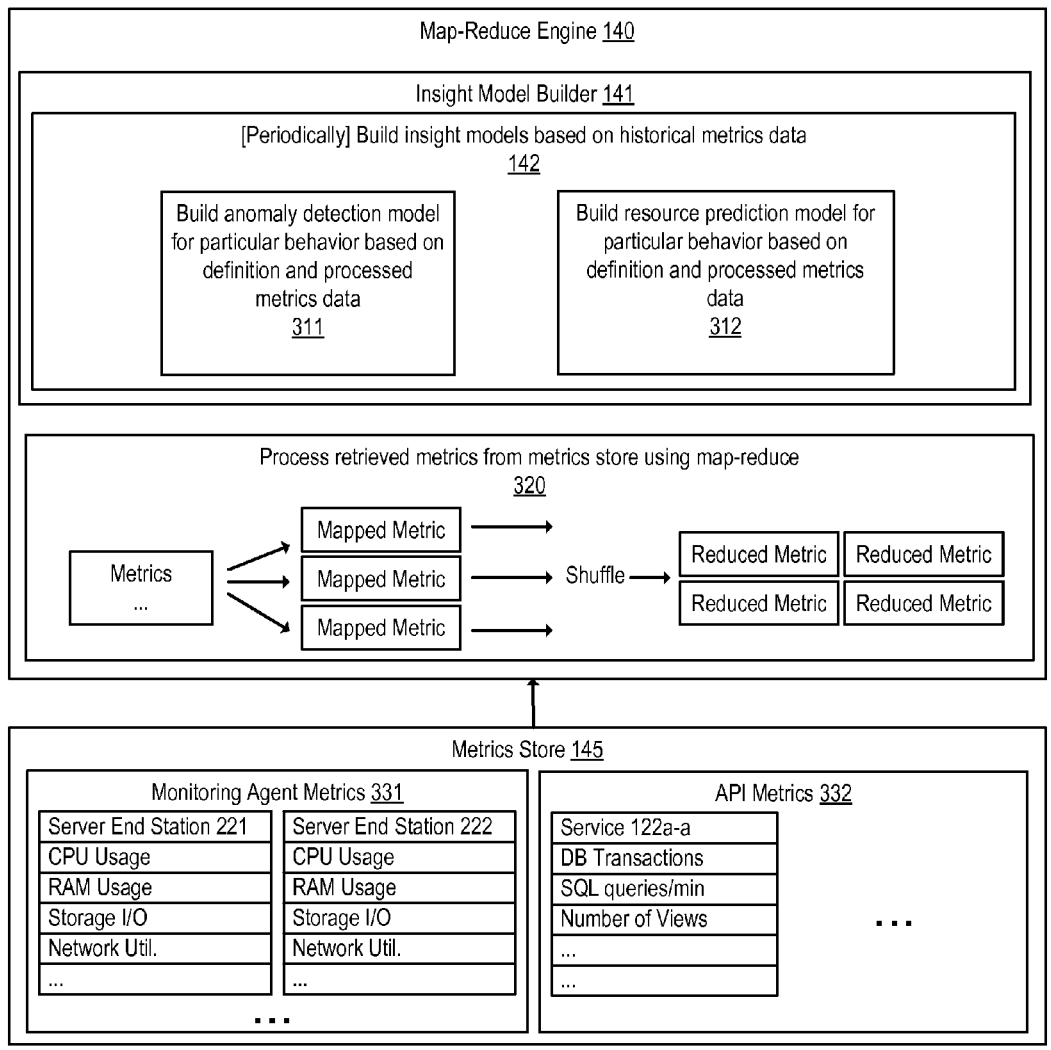
FIG. 3 is detailed block diagram illustrating the map reduce engine 140 and metrics store 145 according to certain embodiments of the invention.

FIG. 3 is detailed block diagram illustrating the map reduce engine 140 and metrics store 145 according to certain embodiments of the invention. The metrics store 145 receives the metrics from the message bus 160 and stores them. In some embodiments, these are stored in a monitoring agent metrics store 331 and an API metrics store 332. The monitoring agent metrics store 331 may store the metrics based on the server end station. Examples of metrics include CPU used, RAM used, storage I/O usage, and network utilization. This information may be stored for each service and server end station combination (e.g., how much CPU does each service use on a particular server end station). The API metrics store 332 may store metrics provided by each service via API 123. This information may be custom metrics defined by each service. Examples of such metrics include database query rate, number of views on database, number of e-commerce transactions, and so on.

The map-reduce engine 140 receives the metrics from the metrics store and at block 320 processes the metrics using map-reduce. The metrics are mapped, shuffled, and reduced so that they are organized in a way to facilitate quick look-up. For example, all CPU usage metrics may be reduced such that they are easy to retrieve and organized together. This allows for the system to easily build the insight models despite having a very large amount of data.

As noted previously, at block 142, insight model builder 141 (periodically) builds insight models based on historical metrics data. The insight model builder 141 may build the model using different methods. At block 311, the insight model builder builds an anomaly detection model for a particular behavior based on the definition provided for the behavior and the processed metrics data from the metrics store 145. This anomaly detection model can be used to determine if a particular service is in an abnormal state. At block 312, the insight model builder builds a resource prediction model for a particular behavior based on the definition provided for the behavior and the processed metrics data from the metrics store 145. This resource prediction model can be used to determine if a particular service is expected to enter an abnormal state. The time to which the service is to enter the abnormal state may be a fixed timeframe or may be an estimated timeframe. Regardless of the time, this resource prediction model allows the system to pre-emptively adjust settings in the system to avoid the potential abnormal state.

In some embodiments, the particular behavior can be modeled using an engineered feature. This engineered feature is a mathematical function of multiple metrics from the virtualized infrastructure 120. For example, an engineered feature could be the ratio of a moving average of CPU usage over a moving average of RAM usage for a particular service. Using the collected (historical) metrics, in some embodiments, the insight model builder 141 builds a mathematical distribution of this engineered feature. In this mathematical distribution (e.g., a normal distribution), some values of the engineered feature are beyond the acceptable ranges and are undesirable, either due to SLA definitions or other criteria set by an administrator (e.g., the value of the engineered feature, if exceeding a certain value, results in performance values below a certain criteria deemed to be acceptable by a customer).

In some embodiments, the particular behavior is a more complicated behavior of the virtualized infrastructure 120 and may be modeled by various machine learning methods. For example, the insight model may be based on a Bayesian model that is able to predict the likelihood of future states of the service based on previous states. Such a machine learning model may require training data, either using a set of training data provided offline or through repeated trainings using real-world data from running the service related to the model over a set time period. After the insight models are built, they are stored in the insight model store 143.

Figure 4:
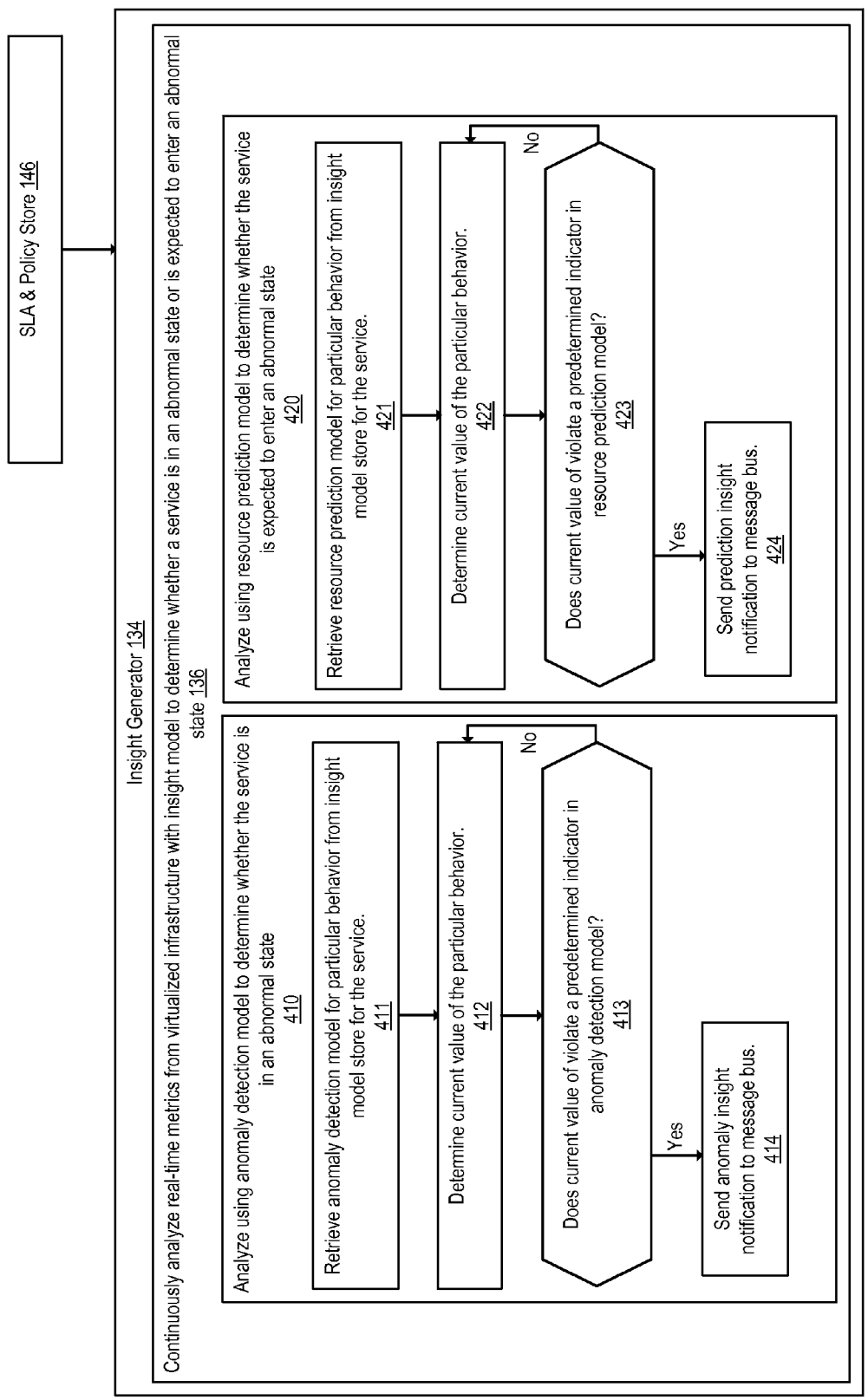
FIG. 4 is detailed block diagram illustrating the insight generator 134 according to certain embodiments of the invention.

FIG. 4 is detailed block diagram illustrating the insight generator 134 according to certain embodiments of the invention. Insight generator 134, at block 136, analyzes real time metrics from the virtualized infrastructure 120 with the insight model to determine whether a service is an abnormal state or is expected to enter an abnormal state. To determine whether a service is an abnormal state, the insight generator 134, at block 410, uses an anomaly detection model to determine whether the service is in an abnormal state. To do this, at block 411, the insight generator 134 retrieves the anomaly detection model for a particular behavior from the insight model for that particular service. At block 412, the insight generator determines the current value of the particular behavior. In some embodiments, the model may be based on an engineered feature and so the value is the output of the function for the engineered feature. In some embodiments, the model may be based on a more complicated machine-learning model and so the value may not be a numerical value but may identify a state in a neural network that was arrived at using one or more real-time and/or historical metrics.

At block 413, the insight generator 134 determines whether the current value determined in block 412 violates a predetermined indicator. If the model uses the engineered feature, then this violation may simply be that the calculated current value exceeds a threshold value. This threshold value may be determined using supervised learning methods or may be pre-configured and is determined with the assistance of the insight model, as the threshold value, in the insight model, is a value that deviates (possibly significantly) from a value that the model considers to be a normal behavior for the engineered feature. If the model is based on more complicated machine learning methods, then the threshold value may be a set of states or other elements in the model that, according to the model, deviate (possibly significantly) from those states or elements in the model that are considered to be a normal behavior (state) for the modeled behavior. If the insight generator 134 determines that the indicator is violated, then at block 414 the insight generator 134 sends a message to the message bus 160 indicating that an insight has been made indicating that a particular service has entered an abnormal state.

At block 420, a similar operation is performed but uses a resource prediction model to determine whether a service is expected to enter an abnormal state. The time period from which the determination is made to when the service enters an abnormal state may be determined by the insight model used, or may be fixed at a particular timeframe.

At block 421, the resource prediction insight model is retrieved for a particular behavior. As this model is used to predict a possible abnormal state, it may be more complicated than a simple engineered feature, and may also make use of both real time and historical metrics to make an accurate prediction of the most likely trend that will follow. Thus, the prediction model may more likely be a machine learning type model that uses various statistical methods to perform an accurate prediction. An example of such a model may be a Hidden Markov Model (HMM), which attempts to model the most likely input state given a set of output states. In this case, the output states may be one or more metrics, and the input state may be the most likely future outcome. Examples of other machine learning models include neural networks, Bayesian networks, and support vector machines. These machines, unlike a simpler model that uses a distribution, may also require previous training and/or supervised learning in order to arrive at an accurate model.

At block 422, the insight generator 134 determines whether the value of the particular behavior according to the model. In the case of a model that uses a HMM, this value may be the predicted input states. In other models, as described above, this value is a different output. At block 423, the insight generator 134 determines whether this value violates a predetermined indicator for that resource prediction model. For example, in the HMM case, a particular range of input values may be considered to indicate that an abnormal state is expected to occur. If the insight generator 134 determines that the indicator is violated, then at block 424 the insight generator 134 sends a message to the message bus 160 indicating that an insight has been made indicating that a particular service is expected to enter an abnormal state.

In some embodiments, these indicators may be stored in the SLA store 146.

Figure 5:
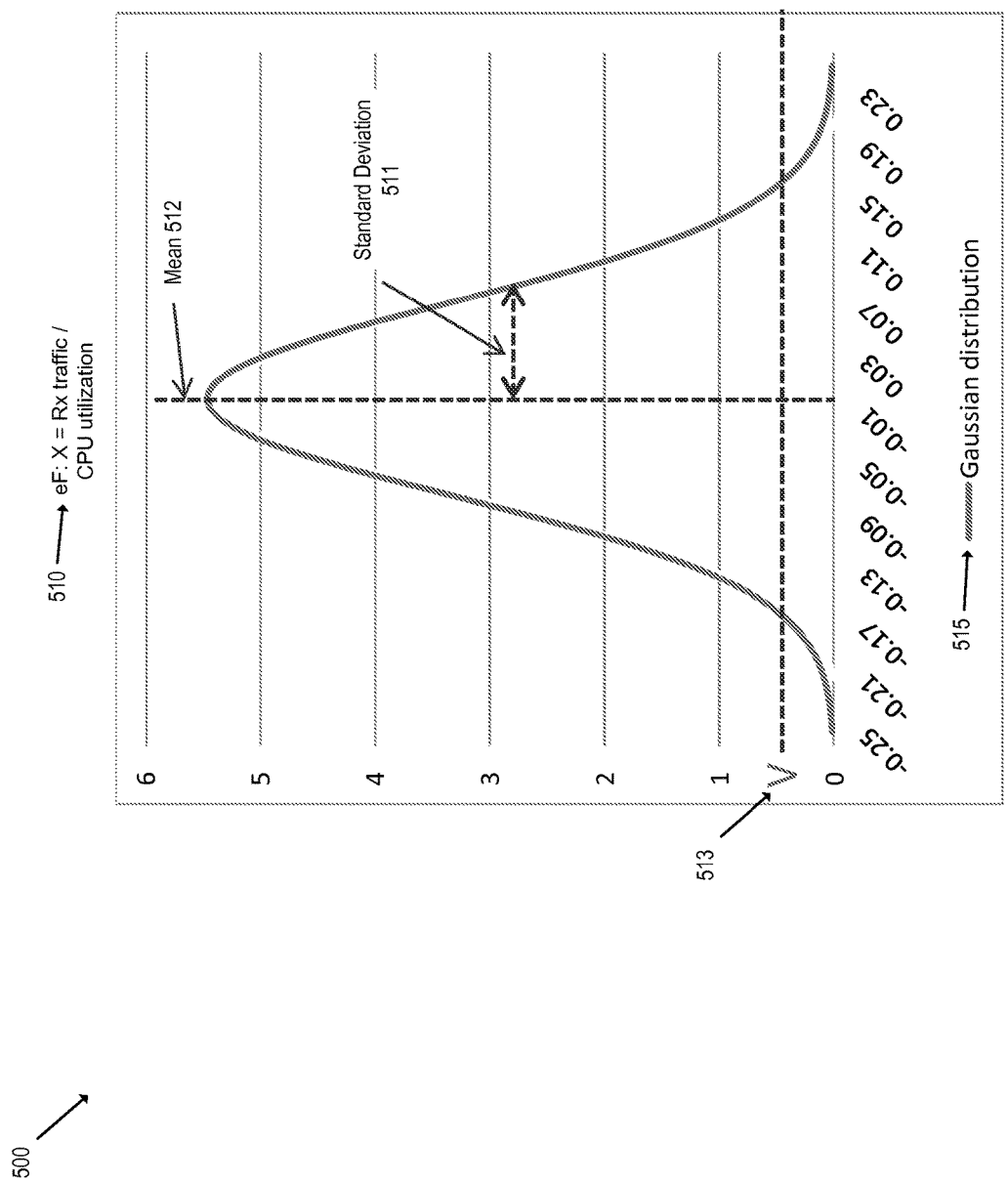
FIG. 5 is an exemplary insight model 500 according to certain embodiments of the invention.

FIG. 5 is an exemplary insight model 500 according to certain embodiments of the invention. The particular behavior modeled by this exemplary insight model 500 may be represented by the engineered feature 510. An example of an engineered feature is the formula of the ratio between received traffic and CPU utilization. This engineered feature is plotted using collected historical metrics data, and this results in a normal distribution as shown with mean 512 and standard deviation 511. In this case, the normal (or Gaussian) distribution 515 indicates that historically, the value of the ratio between received traffic and CPU utilization is most commonly at the mean 512 position and has a standard deviation 511 in terms of variability. This distribution is the model for this behavior. Furthermore, the indicator for this model is the value V 513, indicated by the dashed line. According to the model, any values of the engineered feature that are distributed beyond this line indicate that the service represented by this model is in an abnormal state. Note that using the values of the distribution as indicated in the graph, values below approximately −0.17 and those above 0.19 may be considered to be abnormal. Note that the numbers in the horizontal scale for FIG. 5 are for display purposes only, and that although the horizontal scale has a negative value component, in some cases the engineered feature cannot be negative and so the scale would not enter a negative value.

Figure 6:
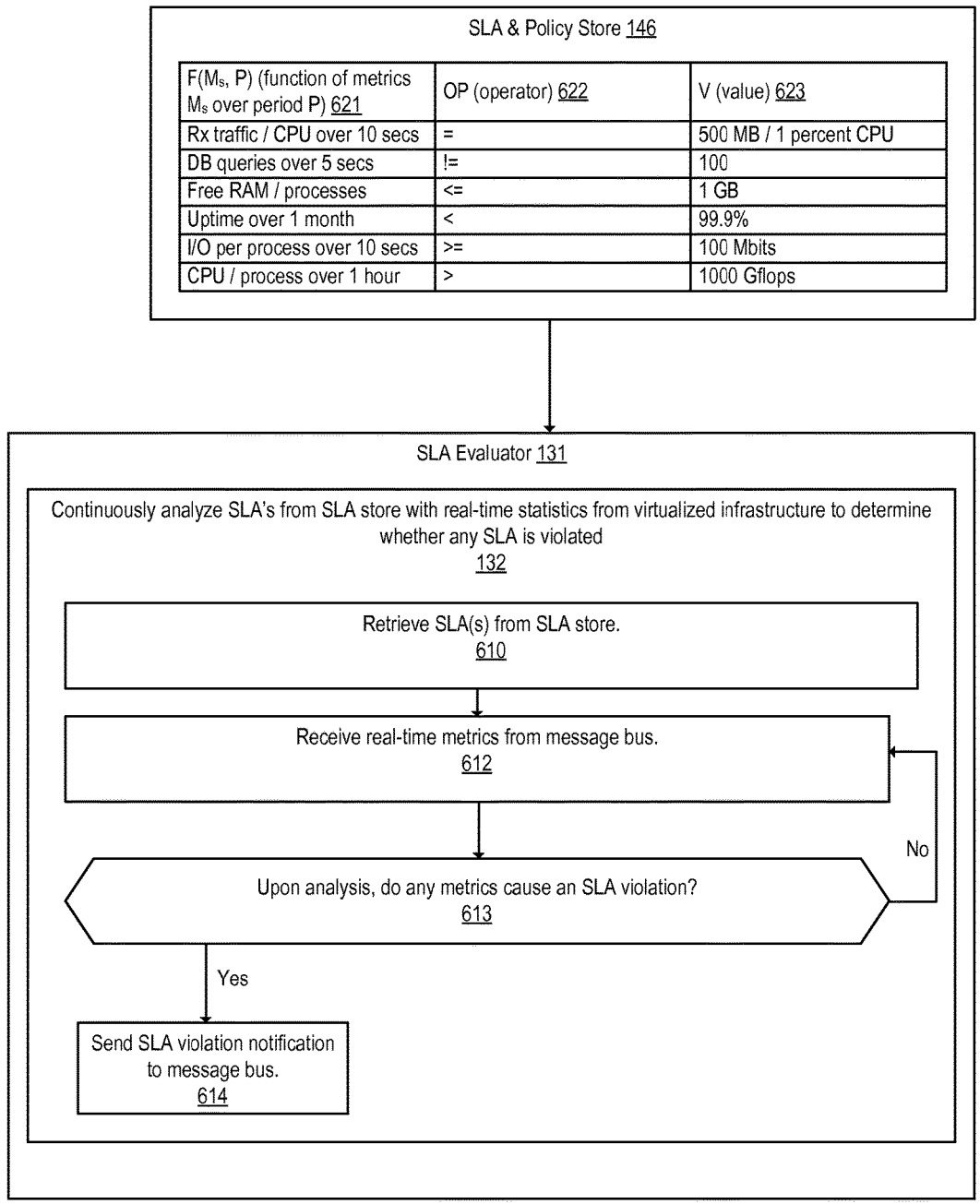
FIG. 6 is detailed block diagram illustrating the SLA store 146 and SLA evaluator 131 according to certain embodiments of the invention.

FIG. 6 is detailed block diagram illustrating the SLA store 146 and SLA evaluator 131 according to certain embodiments of the invention. SLA definitions and policies are stored in the SLA and policy store 146. SLA definitions comprise a function 621 of metrics over a period of time, an operator 622, and a value 623. Examples of functions 621 include network I/O counts over a 10 second period, or CPU per process over an hour period, etc. Operators 622 may include mathematical operators, such as equals, greater than, less than or equal to, or may also include more complicated logic operators that may include if statements and other logic but which result in a Boolean result. The values 623 may be any value, including rates, percentages, amounts, etc. Examples of values include transfer rates in Mbits, floating point operations, etc. The SLA definition is violated when the function paired with the operator and the value does not result in a true statement given the metrics. For example, if the SLA definition states that average CPU over a 1 minute period should be less than 90%, then if the average CPU over the 1 minute period was 95%, then the SLA definition is violated. Once an SLA definition is violated, then an associated SLA policy determines what actions to take. Examples of SLA policy actions include adding additional computing resources, or throttling requests, or notifying an administrator.

The SLA definitions are retrieved by the SLA evaluator 131 at block 610. At block 612, the SLA evaluator 131 receives the real time metrics from the message bus 160. At block 613, the SLA evaluator 131 determines whether any metrics, when inputted into the functions in the SLA definitions, result in a violation. If a violation has occurred, then at block 614 an SLA violation notification is sent to the message bus 160. Otherwise, flow may proceed back to block 612.

Figure 7:
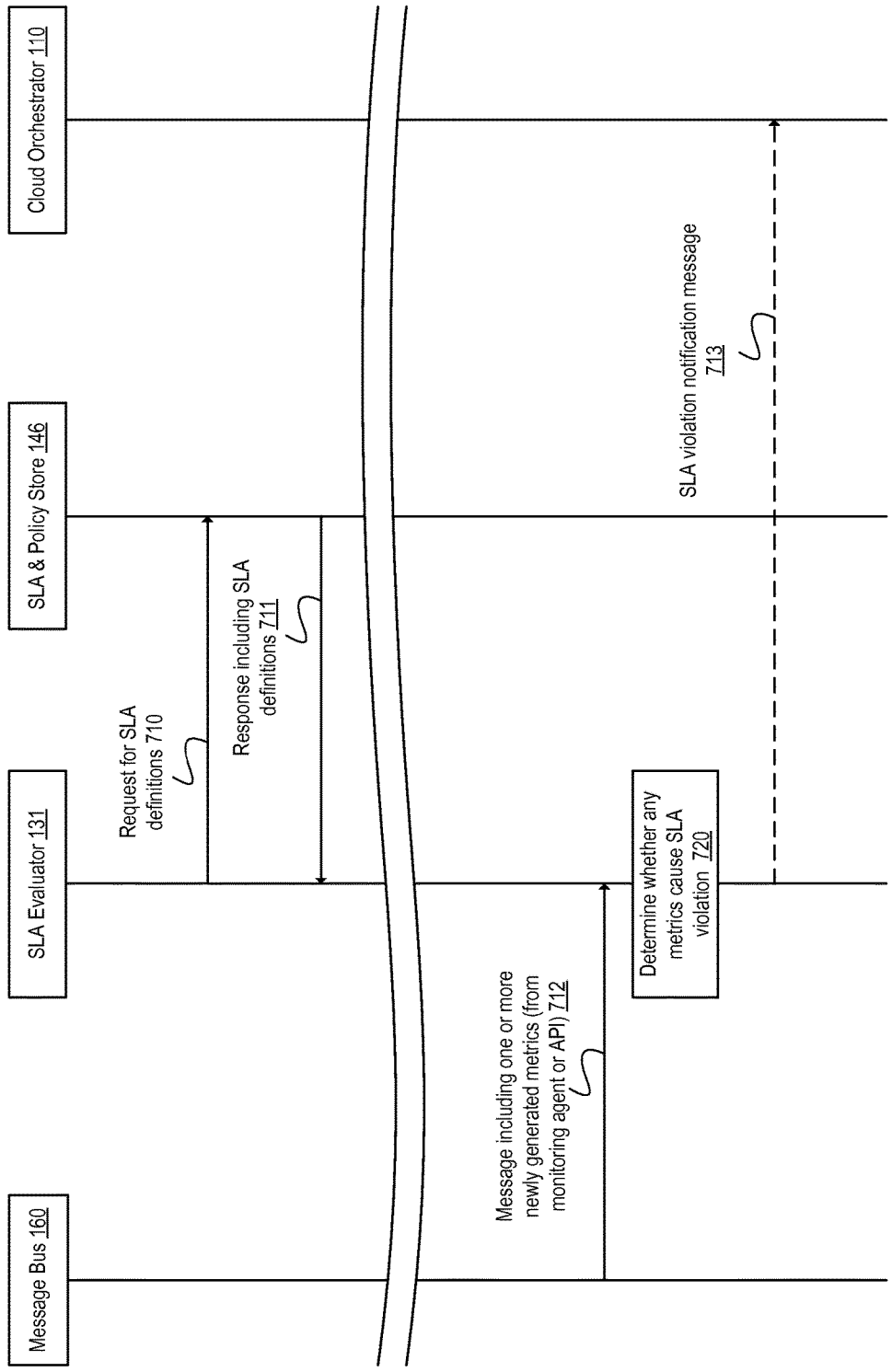
FIG. 7 is a transactional diagram 700 illustrating the triggering of an SLA violation according to certain embodiments of the invention.

FIG. 7 is a transactional diagram 700 illustrating the triggering of an SLA violation according to certain embodiments of the invention. Initially, the SLA evaluator 131 sends a request 710 for the SLA definitions to the SLA store 146. The SLA store 146 then sends a response 711 back with the SLA definitions. As noted previously, each SLA definitions include a function of metrics over a period of time, an operator, and a value. Subsequently, one or more messages 712 are received by the SLA evaluator 131 via the message bus 160. At block 720, the SLA evaluator 131 then determines whether any metrics have caused an SLA violation. If a violation has occurred, then the SLA evaluator 131 sends an SLA violation notification message 713 to the cloud orchestrator (via the message bus 160). A similar operation may occur for insight messages. However, the difference would be that at least the insight generator 134 is substituted for the SLA evaluator 131 and the insight model store 143 is substituted for the SLA store 146. In such a case, the insight generator 134 would retrieve the insight models from the insight model store 143, and using the metrics received from the message bus 160, would determine whether an insight should be generated to indicate that a service is in an abnormal state or is expected to enter an abnormal state. This message is then passed to the cloud orchestrator.

Figure 8:
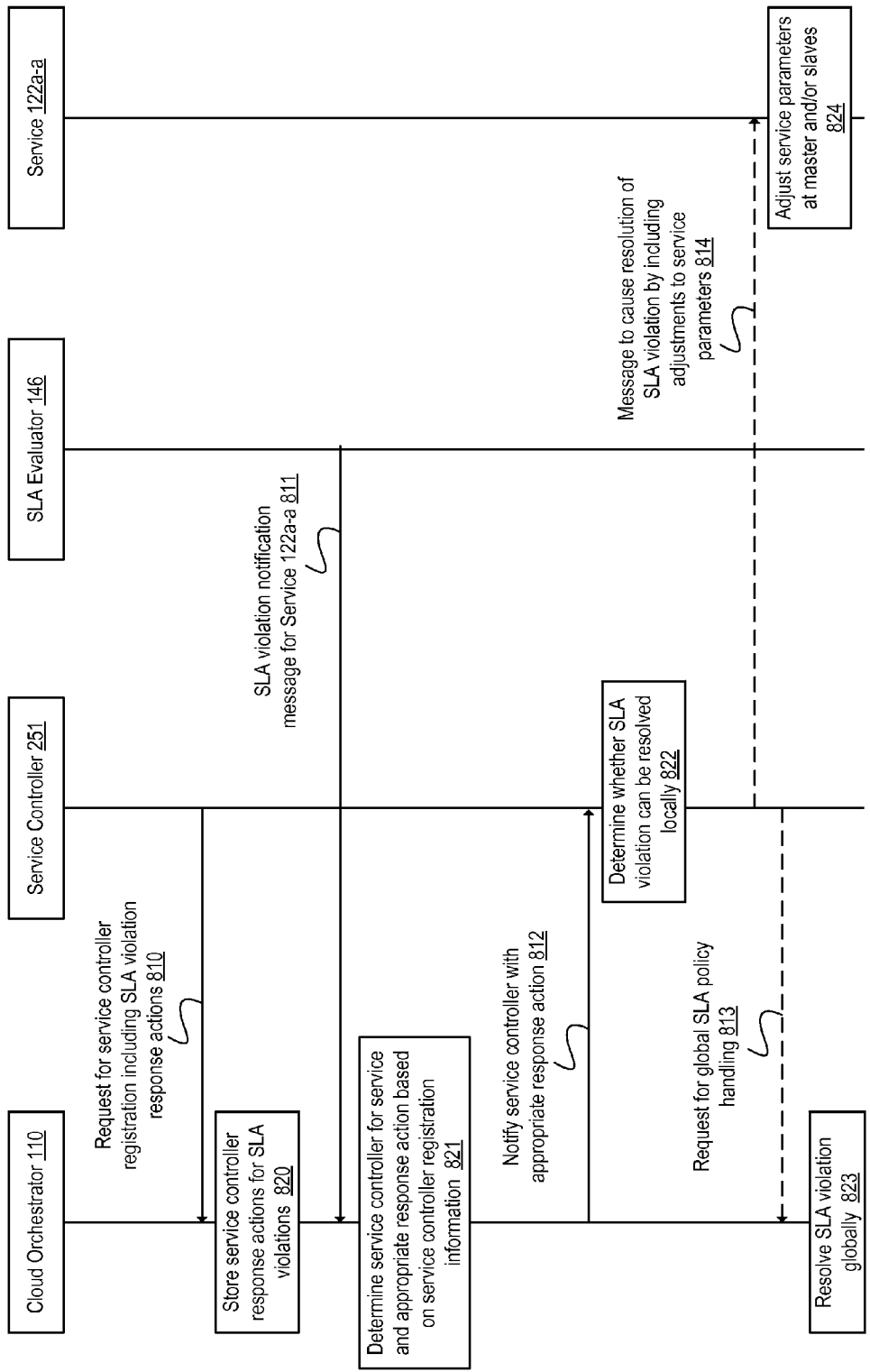
FIG. 8 is a transactional diagram 800 illustrating the reaction to a SLA violation according to certain embodiments of the invention.

FIG. 8 is a transactional diagram 800 illustrating the reaction to a SLA violation according to certain embodiments of the invention. Initially, a service controller 251 sends a request 810 to the cloud orchestrator 110 to register itself (e.g., reachability information, associated service) and also to indicate to the cloud orchestrator 110 of the response actions that the service controller 251 may react upon. Such actions could be simple actions such as "resolve/treat SLA violation", or could be more complicated events such as "increase capacity", etc. At block 820, the cloud controller 110 stores the information from request 810. Subsequently, the SLA evaluator 146 sends a SLA violation notification message 811 for service 122a-a, which is associated with the service controller 251. The method of generating the SLA violation message is described above. Once the cloud orchestrator 110 receives the notification message 811, at block 821 it determines the service controller for the service and the appropriate response action based on the registration information previously provided by the service controller. This action could simply be "treat SLA violation", or may be a more complicated action if available. The action may be based on the type of SLA violation that is triggered. For example, if the SLA violation is related to low storage, then the action could be to increase storage space.

Upon making the determination at block 821, the cloud orchestrator 110 sends a notification message 812 to the service controller 251 with the appropriate response action. At block 822, the service controller 251 has received the notification message 812 and determines whether it may resolve the SLA violation locally. For example, the service controller may only need to throttle requests, which it may instruct the workers for the service to do based on a configuration change. In such a case the service controller 251 sends a message 814 to the service 122a-a to resolve the SLA violation condition by adjusting certain service parameters which the service controller 251 has determined can resolve the SLA violation condition. At block 824 the service (i.e., the workers) adjust the respective parameters.

However, in some cases the service controller 251 may not be able to resolve the issue locally. For example, if the resolution requires the allocation of additional hardware resources, then the cloud orchestrator 110 may be required as only the cloud orchestrator 110 may have the ability to assign hardware resources. In this latter case, the service controller 251 sends a request 813 to the cloud orchestrator 110 for the cloud orchestrator 110 to resolve the SLA violation condition. At block 823 the cloud orchestrator 110, after receiving the request 813, resolves the SLA violation condition globally.

FIG. 9 is a is a flow diagram 900 according to an embodiment of the invention for a system and method for analytics-driven service level agreement (SLA) management and insight generation in clouds according to certain embodiments of the invention. The operations in flow diagram 900 may be performed by a server end station executing the stream analytics engine 130. At block 902, the server end station receives one or more insight models from an insight model builder, wherein each insight model is a based on one or more metrics previously collected from a virtualized infrastructure, and wherein each insight model models a particular behavior in the virtualized infrastructure. In some embodiments, the virtualized infrastructure comprises a plurality of server end stations executing one or more service controllers, one or more master workers, and one or more slave workers, wherein each service controller is associated with one or more workloads, wherein each service controller is communicatively coupled with one of the one or more master workers, wherein each master worker controls one or more of the one or more slave workers, wherein the master worker and controlled slave workers execute the workload associated with the service controller that is communicatively coupled with that master worker, and wherein each service controller is associated with a service.

At block 904, the server end station receives real time metrics from the virtualized infrastructure. At block 906, the server end station, for each of the one or more insight models, determines based on the received real time metrics that one or more services on the virtualized infrastructure is in an abnormal state or is expected to enter the abnormal state, wherein the abnormal state occurs when the insight model indicates that the associated modeled behavior violates a predetermined indicator. At block 908, the server end station sends on a message bus a message indicating that the one or more services is in an abnormal state or is expected to enter the abnormal state.

In some embodiments, the server end station further retrieves one or more service level agreements (SLAs) from an SLA store for one or more services; determines that the real time metrics violate at least one of the one or more SLAs; and sends on the message bus a message indicating that one or more SLA violations have occurred for the one or more SLAs. In some embodiments, the SLA store includes one or more SLAs, wherein each SLA includes at least a function of metrics over a period of time, an operator, and a threshold value.

In some embodiments, the message indicating that an SLA violation has occurred, when received by a cloud orchestrator, causes the cloud orchestrator to send a message to the service controller associated with the SLA to resolve the SLA violation by adjusting the parameters of the master and slave workers associated with the service controller.

In some embodiments, an application programming interface (API) is exposed to each workload, and wherein custom metrics are collected from each workload using the API.

In some embodiments, the insight model is an anomaly detection model for modeling whether a service is currently in an abnormal state.

In some embodiments, the insight model is at least one of a normal distribution of a behavior that is modeled using a function computed based on one or more metrics. In some embodiments, the insight model is a resource prediction model for modeling whether a service is expected to enter an abnormal state.

Figure 10:
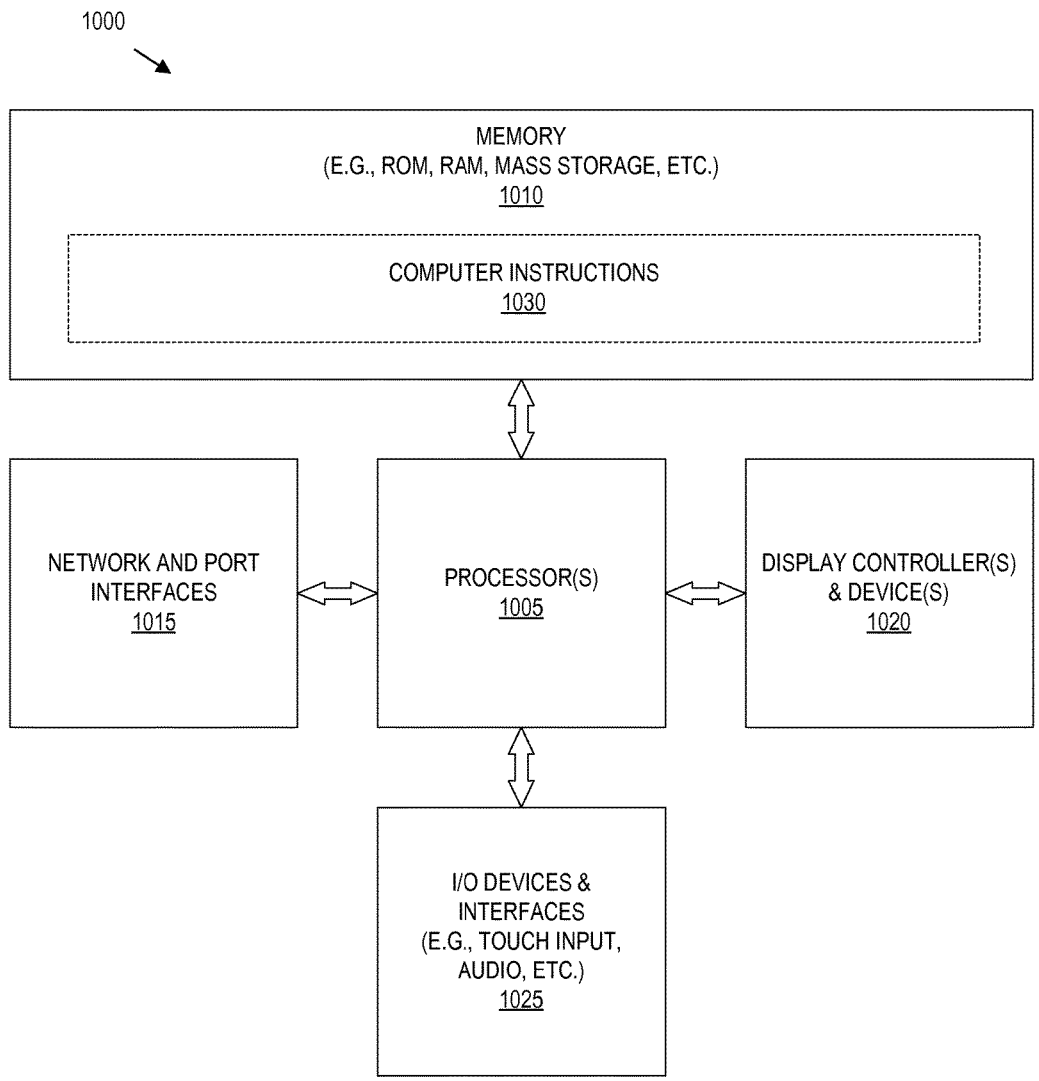
FIG. 10 illustrates a block diagram for an exemplary data processing system 1000 that may be used in some embodiments.

FIG. 10 illustrates a block diagram for an exemplary data processing system 1000 that may be used in some embodiments. Data processing system 1000 includes one or more microprocessors 1005 and connected system components (e.g., multiple connected chips). Alternatively, the data processing system 1000 is a system on a chip. One or more such data processing systems 1000 may be utilized to implement the functionality of the modules, server end stations, hosts, or other devices as illustrated above in FIGS. 1-9.

The data processing system 1000 includes memory 1010, which is coupled to the microprocessor(s) 1005. The memory 1010 may be used for storing data, metadata, and programs for execution by the microprocessor(s) 1005. For example, the depicted memory 1010 may store computer instructions 1030 that, when executed by the microprocessor(s) 1005, causes the data processing system 1000 to perform the operations described herein. The memory 1010 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1010 may be internal or distributed memory. In some embodiments, a portion or all of the computer instructions 1030 are stored on an external cloud device.

The data processing system 1000 may also include a display controller and display device 1020 that provides a visual user interface for the user, e.g., GUI elements or windows. The display device 1020 may also display various media content to the user. The data processing system 1000 also includes one or more input or output ("I/O") devices and interfaces 1025, which are provided to allow a user to provide input to, receive output from, and otherwise transfer data to and from the system. These I/O devices 1025 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1000. The I/O devices and interfaces 1025 may also include a connector for a dock or a connector for a USB interface, FireWire, Thunderbolt, Ethernet, etc., to connect the system 1000 with another device, external component, or a network. Exemplary I/O devices and interfaces 1025 also include wireless transceivers, such as an IEEE 1002.11 transceiver, an infrared transceiver, a Bluetooth transceiver, a wireless cellular telephony transceiver (e.g., 2G, 3G, 4G), or another wireless protocol to connect the data processing system 1000 with another device, external component, or a network and receive stored instructions, data, tokens, etc. In some embodiments, these various components will be provided as a system on a chip (SoC). It will be appreciated that one or more buses may be used to interconnect the various components shown in FIG. 10.

For example, the data processing system 1000 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1000 may be a network computer, server, network device, router, or an embedded processing device within another device or consumer electronic product. As used herein, the terms computer, system, device, processing device, and "apparatus comprising a processing device" may be used interchangeably with the term data processing system 1000 and include the above-listed exemplary embodiments.

It will be appreciated that additional components, not shown, may also be part of the system 1000, and, in certain embodiments, fewer components than that shown in FIG. 10 may also be used in a data processing system 1000. For example, in some embodiments where the data processing system 1000 is a router, the router may have one or more control cards configure routing in the network and one or more line cards to switch packets in a network based on the routing configuration from the control cards.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1010 or other non-transitory machine-readable storage medium. The software may further be transmitted or received over a network (not shown) via a network and/or port interface 1015. In various embodiments, hardwired circuitry may be used in combination with the software instructions to implement the present embodiments. Thus, the techniques are not limited to any specific combination of hardware circuitry and software, or to any particular source for the instructions executed by the data processing system 1000.

An electronic device, such as the media devices, portable client devices, server computing devices, and/or content servers described herein, stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

Alternative Embodiments

The operations in the flow diagrams have been described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Similarly, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method executed by a processor of a server end station of a cloud for determining whether one or more service level agreement (SLA) violations have occurred or are expected to occur, the method comprising:

receiving real time metrics at a metrics store from a virtualized infrastructure, wherein the real time metrics are retrieved by a map-reduce engine, wherein the virtualized infrastructure comprises a plurality of server end stations executing one or more service controllers, one or more master workers, and one or more slave workers, wherein each service controller is associated with one or more workloads, and is communicatively coupled with one of the one or more master workers, wherein each master worker controls at least one of the one or more slave workers, wherein each master worker and the controlled at least one slave worker execute workload associated with the service controller that is communicatively coupled with that master worker, and wherein each service controller is associated with a service;

receiving one or more insight models from an insight model builder comprised in the map-reduce engine, wherein each insight model is built using the map-reduce engine, wherein to build each insight model, the map-reduce engine processes the real time metrics, and wherein each insight model models a particular behavior in the virtualized infrastructure;

for each of the one or more insight models, determining, by an insight generator, that one or more services on the virtualized infrastructure are in an abnormal state or are expected to enter the abnormal state, wherein the determination is based on a comparison of a current value of the particular behavior of a corresponding insight model with a predetermined indicator comprised in the corresponding insight model, and wherein the abnormal state occurs when the corresponding insight model indicates that the associated modeled particular behavior violates the predetermined indicator;

sending, on a message bus, a message indicating that the one or more services are in the abnormal state or are expected to enter the abnormal state; and sending, on the message bus, a message indicating that the one or more SLA violations have occurred for one or more SLAs, wherein the message indicating that the one or more SLA violations have occurred, when received by a cloud orchestrator that performs maintenance and administrative tasks associated with the virtualized infrastructure, causes the cloud orchestrator to: determine a service controller, of the one or more service controllers, associated with an SLA to resolve the one or more SLA violations, determine associated response action based on registration information previously provided by the service controller, and send a notification message to the service controller to resolve the one or more SLA violations, wherein the service controller, in response to receiving the notification message, provides instructions to the one or more master and slave workers associated with the service controller to adjust respective parameters of the one or more master and slave workers associated with the service controller in order to resolve the one or more SLA violations for the one or more workloads associated with the service controller, thereby facilitating enforcement of the one or more SLAs for each workload associated with the one or more service controllers executing on the virtualized infrastructure.

2. The method of claim 1, further, before sending on the message bus the message indicating that the one or more SLA violations have occurred for the one or more SLAs, comprising:

retrieving the one or more SLAs from an SLA store for the one or more services; and determining that the real time metrics violate at least one of the one or more SLAs.

3. The method of claim 2, wherein the SLA store includes the one or more SLAs, and wherein each SLA includes at least a function of metrics over a period of time, an operator, and a threshold value.

4. The method of claim 1, wherein an application programming interface (API) is exposed to each workload, and wherein custom metrics are collected from each workload using the API.

5. The method of claim 1, wherein each insight model is an anomaly detection model for determining whether a service of the one or more services is currently in the abnormal state.

6. The method of claim 5, wherein each insight model is at least one of a normal distribution of a behavior that is modeled using a function computed based on one or more of historical metrics.

7. The method of claim 1, wherein each insight model is a resource prediction model for determining whether a service of the one or more services is expected to enter the abnormal state.

8. A server end station of a cloud for determining whether one or more service level agreement (SLA) violations have occurred or are expected to occur, the server end station comprising:
a processor and a memory, the memory comprising instructions executable by the processor, whereby the processor is operative to:
receive real time metrics at a metrics store from a virtualized infrastructure, wherein the real time metrics are retrieved by a map-reduce engine, wherein the virtualized infrastructure comprises a plurality of server end stations that executes one or more service controllers, one or more master workers, and one or more slave workers, wherein each service controller is associated with one or more workloads, and is communicatively coupled with one of the one or more master workers, wherein each master worker controls at least one of the one or more slave workers, wherein each master worker and the controlled at least one slave worker execute workload associated with the service controller that is communicatively coupled with that master worker, and wherein each service controller is associated with a service;
receive one or more insight models from an insight model builder comprised in the map-reduce engine, wherein each insight model is built using the map-reduce engine, wherein to build each insight model, the map-reduce engine processes the real time metrics, and wherein each insight model models a particular behavior in the virtualized infrastructure;
for each of the one or more insight models, determine, by an insight generator, that one or more services on the virtualized infrastructure are in an abnormal state or are expected to enter the abnormal state, wherein the determination is based on a comparison of a current value of the particular behavior of a corresponding insight model with a predetermined indicator comprised in the corresponding insight model, and wherein the abnormal state occurs when the corresponding insight model indicates that the associated modeled particular behavior violates the predetermined indicator;
send on a message bus, a message indicating that the one or more services are in the abnormal state or are expected to enter the abnormal state; and
send, on the message bus, a message indicating that the one or more SLA violations have occurred for one or more SLAs, wherein the message indicating that the one or more SLA violations have occurred, when received by a cloud orchestrator that performs maintenance and administrative tasks associated with the virtualized infrastructure, causes the cloud orchestrator to: determine a service controller, of the one or more service controllers, associated with an SLA to resolve the one or more SLA violations, determine associated response action based on registration information previously provided by the service controller, and send a notification message to the service controller to resolve the one or more SLA violations, wherein the service controller, in response to the reception of the notification message, provides instructions to the one or more master and slave workers associated with the service controller to adjust respective parameters of the one or more master and slave workers associated with the service controller in order to resolve the one or more SLA violations for the one or more workloads associated with the service controller, which facilitates enforcement of the one or more SLAs for each workload associated with the one or more service controllers that executes on the virtualized infrastructure.

9. The server end station of claim 8, further, before sending on the message bus the message indicating that the one or more SLA violations have occurred for the one or more SLAs, operative to:
retrieve the one or more SLAs from an SLA store for the one or more services; and
determine that the real time metrics violate at least one of the one or more SLAs.

10. The server end station of claim 9, wherein the SLA store includes the one or more SLAs, and wherein each SLA includes at least a function of metrics over a period of time, an operator, and a threshold value.

11. The server end station of claim 8, wherein an application programming interface (API) is exposed to each workload, and wherein custom metrics are collected from each workload using the API.

12. The server end station of claim 8, wherein each insight model is an anomaly detection model to determine whether a service of the one or more services is currently in the abnormal state.

13. The server end station of claim 12, wherein each insight model is at least one of a normal distribution of a behavior that is modeled using a function computed based on one or more of historical metrics.

14. The server end station of claim 8, wherein each insight model is a resource prediction model to determine whether a service of the one or more services is expected to enter the abnormal state.

15. A non-transitory computer-readable storage medium having instructions stored therein, wherein the instructions, when executed by a processor of a server end station of a cloud, cause the processor to perform operations for determining whether one or more service level agreement (SLA) violations have occurred or are expected to occur, the operations comprising:
receiving real time metrics at a metrics store from a virtualized infrastructure, wherein the real time metrics are retrieved by a map-reduce engine, wherein the virtualized infrastructure comprises a plurality of server end stations executing one or more service controllers, one or more master workers, and one or more slave workers, wherein each service controller is associated with one or more workloads, and is communicatively coupled with one of the one or more master workers, wherein each master worker controls at least one of the one or more slave workers, wherein each master worker and the controlled at least one slave worker execute workload associated with the service controller that is communicatively coupled with that master worker, and wherein each service controller is associated with a service;
receiving one or more insight models from an insight model builder comprised in the map-reduce engine, wherein each insight model is built using the map-reduce engine, wherein to build each insight model, the map-reduce engine processes the real time metrics, and wherein each insight model models a particular behavior in the virtualized infrastructure;

for each of the one or more insight models, determining, by an insight generator, that one or more services on the virtualized infrastructure are in an abnormal state or are expected to enter the abnormal state, wherein the determination is based on a comparison of a current value of the particular behavior of a corresponding insight model with a predetermined indicator comprised in the corresponding insight model, and wherein the abnormal state occurs when the corresponding insight model indicates that the associated modeled particular behavior violates the predetermined indicator;

sending, on a message bus, a message indicating that the one or more services are in the abnormal state or are expected to enter the abnormal state; and sending, on the message bus, a message indicating that the one or more SLA violations have occurred for one or more SLAs, wherein the message indicating that the one or more SLA violations have occurred, when received by a cloud orchestrator that performs maintenance and administrative tasks associated with the virtualized infrastructure, causes the cloud orchestrator to: determine a service controller, of the one or more service controllers, associated with an SLA to resolve the one or more SLA violations, determine associated response action based on registration information previously provided by the service controller, and send a notification message to the service controller to resolve the one or more SLA violations, wherein the service controller, in response to receiving the notification message, provides instructions to the one or more master and slave workers associated with the service controller to adjust respective parameters of the one or more master and slave workers associated with the service controller in order to resolve the one or more SLA violations for the one or more workloads associated with the service controller, thereby facilitating enforcement of the one or more SLAs for each workload associated with the one or more service controllers executing on the virtualized infrastructure.

16. The non-transitory computer-readable storage medium of claim 15, the operations further, before sending on the message bus the message indicating that the one or more SLA violations have occurred for the one or more SLAs, comprising:
retrieving the one or more SLAs from an SLA store for the one or more services; and
determining that the real time metrics violate at least one of the one or more SLAs.

17. The non-transitory computer-readable storage medium of claim 16, wherein the SLA store includes the one or more SLAs, and wherein each SLA includes at least a function of metrics over a period of time, an operator, and a threshold value.

18. The non-transitory computer-readable storage medium of claim 15, wherein an application programming interface (API) is exposed to each workload, and wherein custom metrics are collected from each workload using the API.

19. The non-transitory computer-readable storage medium of claim 15, wherein each insight model is an anomaly detection model for determining whether a service of the one or more services is currently in the abnormal state.

20. The non-transitory computer-readable storage medium of claim 19, wherein each insight model is at least one of a normal distribution of a behavior that is modeled using a function computed based on one or more of historical metrics.

21. The non-transitory computer-readable storage medium of claim 15, wherein each insight model is a resource prediction model for determining whether a service of the one or more services is expected to enter the abnormal state.

* * * * *